(12) United States Patent
Hirman et al.

(10) Patent No.: US 10,309,583 B2
(45) Date of Patent: Jun. 4, 2019

(54) SUPPORT MECHANISM FOR A CONSTRUCTION MACHINE

(71) Applicant: Caterpillar Paving Products Inc., Brooklyn Park, MN (US)

(72) Inventors: Colton Hirman, Maple Grove, MN (US); Robert D. Rukavina, Arden Hills, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 0 days.

(21) Appl. No.: 15/709,645

(22) Filed: Sep. 20, 2017

(65) Prior Publication Data

US 2019/0086026 A1    Mar. 21, 2019

(51) Int. Cl.
| | |
|---|---|
| *E01C 23/08* | (2006.01) |
| *F16M 13/02* | (2006.01) |
| *B62D 65/00* | (2006.01) |
| *E01C 23/12* | (2006.01) |
| *E01C 23/088* | (2006.01) |

(52) U.S. Cl.
CPC ........... *F16M 13/022* (2013.01); *B62D 65/00* (2013.01); *E01C 23/088* (2013.01); *E01C 23/127* (2013.01)

(58) Field of Classification Search
CPC ............................. E01C 23/088; E01C 23/127
See application file for complete search history.

(56) References Cited

U.S. PATENT DOCUMENTS

| | | | | |
|---|---|---|---|---|
| 3,319,580 A | * | 5/1967 | Bohm | ........................ B66C 6/00 104/118 |
| 5,692,807 A | * | 12/1997 | Zimmerman | ........... E21C 25/58 299/30 |
| 6,296,318 B1 | * | 10/2001 | Simons | ................. E01C 23/088 198/300 |
| 9,267,446 B2 | | 2/2016 | Killion | |

* cited by examiner

*Primary Examiner* — Janine M Kreck

(74) *Attorney, Agent, or Firm* — Schwegman, Lundberg & Woessner

(57) ABSTRACT

A construction machine includes a frame. The machine includes an engine mounted on the frame. The machine includes a milling tool rotatably mounted on the frame and configured to be selectively coupled to the engine. The machine also includes a conveyor removably mounted on the frame. The machine further includes a support mechanism mounted on the frame. The support mechanism includes a track member secured to the frame. The support mechanism also includes at least one carriage member movably mounted on the track member. The support mechanism further includes an attachment member secured to the at least one carriage member and the conveyor. The attachment member is configured to be selectively unsecured from the conveyor. The support mechanism is configured to move at least a portion of the conveyor relative to the construction machine.

20 Claims, 9 Drawing Sheets

SUPPORT MECHANISM FOR A CONSTRUCTION MACHINE

TECHNICAL FIELD

The present disclosure relates to a support mechanism for a construction machine. More particularly, the present disclosure relates to the support mechanism for a conveyor of the construction machine.

BACKGROUND

A machine, such as a cold planar, may typically include a conveyor installed therein. The conveyor may be employed for receiving material from a cutting tool of the machine, and further conveying the received material out of the machine or to another section of the machine, such as a secondary conveyor. In many situations, the conveyor may be installed within the machine, such that limited space may be available around the conveyor in order to access various portions or mounting locations of the conveyor.

Accordingly, during a removal or installation of the conveyor on the machine, such as during maintenance, repair, or replacement, a complicated process may be employed involving a scheduled procedure, requirement of skilled labor, specialized components and systems, such as lifts, tools, and so on. This can result in increased labor effort, increased service duration, increased machine downtime, and increased cost. Hence, there is a need for an improved support mechanism for components employed in such machines.

SUMMARY OF THE DISCLOSURE

In an aspect of the present disclosure, a construction machine is provided. The machine includes a frame. The machine includes an engine mounted on the frame. The machine includes a milling tool rotatably mounted on the frame and configured to be selectively coupled to the engine. The machine also includes a conveyor removably mounted on the frame. The machine further includes a support mechanism mounted on the frame. The support mechanism includes a track member secured to the frame. The support mechanism also includes at least one carriage member movably mounted on the track member. The support mechanism further includes an attachment member secured to the at least one carriage member and the conveyor. The attachment member is configured to be selectively unsecured from the conveyor. The support mechanism is configured to move at least a portion of the conveyor relative to the construction machine.

In another aspect of the present disclosure, a support mechanism for a conveyor associated with a construction machine is provided. The support mechanism includes a track member configured to be secured to the construction machine. The support mechanism also includes at least one carriage member configured to be movably mounted on the track member. The support mechanism further includes an attachment member configured to be secured to the at least one carriage member and the conveyor. The attachment member is configured to be selectively unsecured from the conveyor. The support mechanism is configured to move at least a portion of the conveyor relative to the construction machine.

In yet another aspect of the present disclosure, a method for removal of a conveyor of a construction machine is illustrated. The conveyor is removably mounted on a frame of the construction machine. The method includes decoupling a first end of the conveyor with respect to the frame. The method includes coupling the first end of the conveyor with respect to a support mechanism. The method includes decoupling a second end of the conveyor with respect to the frame. The method includes sliding at least a portion of the support mechanism to move at least a portion of the conveyor out of the construction machine. The method includes coupling a lifting system with respect to a lift point on the conveyor. The method also includes decoupling the first end of the conveyor with respect to the support mechanism. The method further includes removing the conveyor from the construction machine using the lifting system.

Other features and aspects of this disclosure will be apparent from the following description and the accompanying drawings.

DETAILED DESCRIPTION

Figure 1:
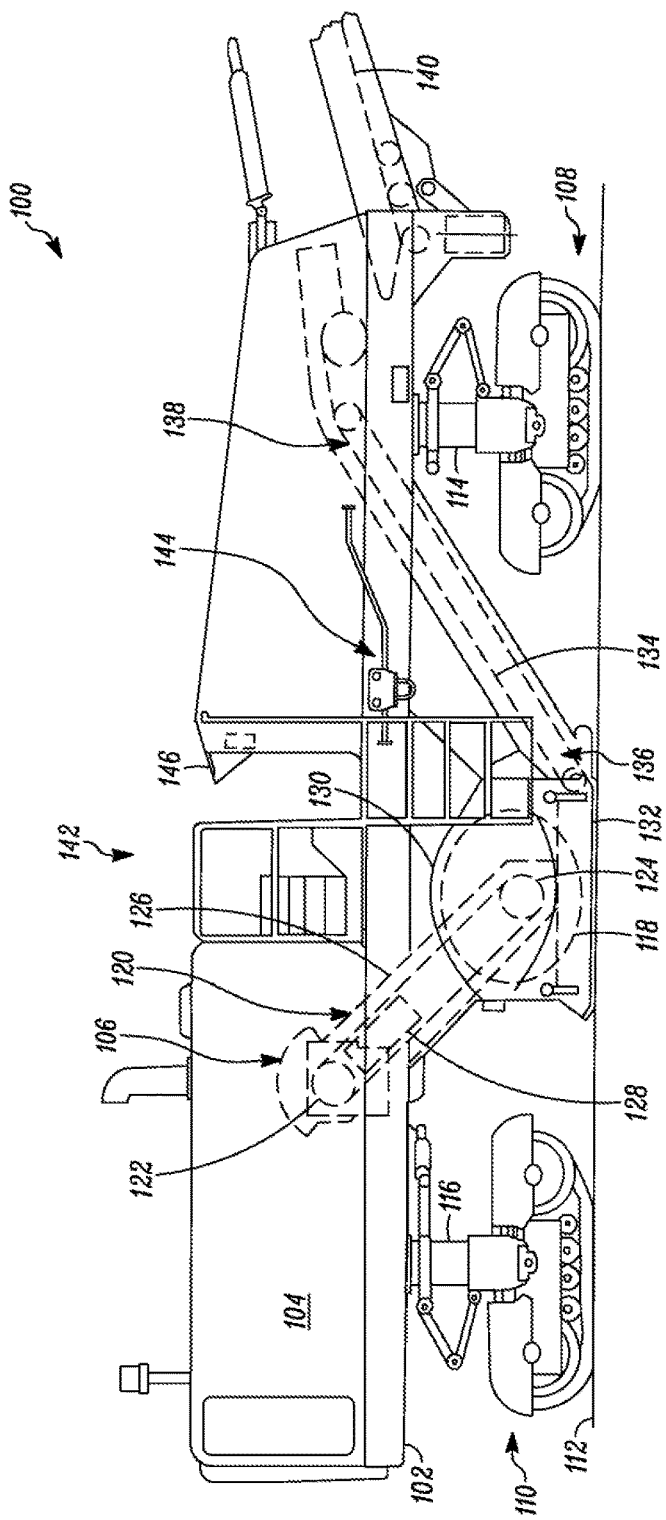
FIG. 1 is a side view of an exemplary machine, according to one embodiment of the present disclosure.

Wherever possible, the same reference numbers will be used throughout the drawings to refer to the same or the like parts. Referring to FIG. 1, an exemplary construction machine 100 is illustrated. More specifically, the machine 100 is a cold planar. The machine 100 includes a frame 102. The frame 102 is configured to support one or more components of the machine 100. The machine 100 includes an enclosure 104 mounted on the frame 102. The enclosure 104 is configured to house a power source 106 mounted on the frame 102 therein. The power source 106 is configured to provide power to the machine 100 for mobility and operational requirements. The power source 106 may be any power source known in the art including, but not limited to, an internal combustion engine, a motor, batteries, and/or a combination thereof.

The machine 100 includes a front track assembly 108 and a rear track assembly 110 mounted on the frame 102 (only two of four track assemblies are shown in FIG. 1). Each of the front track assembly 108 and the rear track assembly 110 is configured to support and provide mobility to the machine 100 on ground 112. The machine 100 includes hydraulic struts 114, 116 extending between the frame 102 and each of the front track assembly 108 and the rear track assembly 110 respectively. Each of the hydraulic struts 114, 116 is configured to selectively extend and retract in order to raise and lower the machine 100 with respect to the ground 112 respectively.

The machine 100 also includes a milling tool 118 rotatably mounted on the frame 102. The milling tool 118 may include a plurality of cutting elements (not shown) provided thereon, such as cutting teeth. The milling tool 118 is configured to remove material from the ground 112 including, but not limited to an asphalt surface and a paved surface, by cutting, scraping, milling, and so on. A depth of a cut or penetration of the cutting teeth of the milling tool 118 may be controlled by appropriate extension or retraction of each of the hydraulic struts 114, 116.

The milling tool 118 may be selectively coupled to the power source 106 using a transmission system 120. In the illustrated embodiment, the transmission system 120 includes a driver pulley 122 operably coupled to the power source 106, a driven pulley 124 operably coupled to the milling tool 118, a belt 126 operably coupled to each of the driver pulley 122 and the driven pulley 124, and a belt tensioner 128 operably coupled to the belt 126. In other embodiments, the transmission system 120 may include any power transmission system known in the art, such as a gear train, a clutch system, a hydraulic system, and so on.

The machine 100 also includes a housing 130 mounted on the frame 102. The housing 130 is configured to at least partially surround the milling tool 118. The housing 130 may be made up of multiple components configured to contain and remove the material of the ground 112 that may be ground up by the milling tool 118. Each of the components may be vertically positioned in order to account for the depth to which the milling tool 118 may dig into the ground 112. For example, the housing 130 may include a side plate 132 disposed on opposing sides of the milling tool 118. The side plate 132 may be selectively raised and lowered in order to provide a visual depth reference as the machine 100 may move on the ground 112 as well as to provide a lateral enclosure to the milling tool 118 and to contain the removed material.

The housing 130 may also include a moldboard (not shown) disposed behind the milling tool 118 with respect to a direction of travel of the machine 100. The moldboard may be positioned at a depth lower than the side plate 132 in order to scrape up loose removed material and clean the ground 112. As such, minimal additional cleanup may be required after the machine 100 may pass over the ground 112. The housing 130 may also include an anti-slab (not shown) disposed in front of the milling tool 118 with respect to the direction of travel of the machine 100. The anti-slab may be positioned above the ground 112 in order to break up the material and limit lifting up large chunks of the material by the milling tool 118 that may not be readily conveyable.

The machine 100 also includes a first conveyor 134 mounted on the frame 102. The first conveyor 134 defines a first end 136 and a second end 138 thereof. The second end 138 is distal with respect to the first end 136. The first conveyor 134 is configured to receive the removed material at the first end 136 thereof from the milling tool 118 and deliver the received material from the second end 138 thereof to a second conveyor 140. The second conveyor 140 is also mounted on the frame 102. The second conveyor 140 and associated components (not shown) thereof may be mounted on the frame 102 and are shown partially in the illustrated FIG. 1. The machine 100 further includes an operator cabin 142 mounted on the frame 102. The operator cabin 142 may include a control console 146 having required instruments in order to allow an operator to control an operation of various components of the machine 100.

The machine 100 also includes a support mechanism 144 mounted on the frame 102. The support mechanism 144 will be hereinafter interchangeably referred to as "the mechanism 144". The mechanism 144 is configured to support and move at least a portion of the first conveyor 134 relative to the machine 100 along directions "D1" and/or "D2", such as during a removal thereof from the machine 100 and/or installation thereof on the machine 100.

Referring to FIGS. 2 to 8, side views of the mechanism 144 and the first conveyor 134 are illustrated. It should be noted that FIGS. 2 to 8 illustrate only the mechanism 144 and the first conveyor 134 while omitting other components of the machine 100 for the purpose of explanation and visual clarity. The mechanism 144 includes a track member 202 secured to the frame 102. It should be noted that the track member 202 may include a linear guide, or any other component and/or mechanism adapted to allow liner movement of one or more associated carriage members with respect thereto, as described hereinafter.

The track member 202 defines a first end 204 and a second end 206 thereof. The second end 206 is disposed distal with respect to the first end 204. The track member 202 may be any rail like element known in the art including, but not limited to, a tubular element, a C-shaped channel, an I-shaped beam, an L-shaped beam, and so on. In the illustrated embodiment, the track member 202 includes a bent configuration. In other embodiments, the track member 202 may include any other configured, such as a straight configuration, and so on, based on application requirements.

The mechanism 144 also includes at least one carriage member 208 movably mounted on the track member 202. In the illustrated embodiment, the mechanism 144 includes a single carriage member 208. In other embodiments, the mechanism 144 may include multiple carriage members 208 based on application requirements. The carriage member 208 includes a plurality of roller members 210. In the illustrated embodiment, the plurality of roller members 210 include two roller members. In other embodiments, the plurality of roller members 210 may include a single or multiple roller members based on application requirements.

Each of the plurality of roller members 210 is movably mounted on the track member 202. Accordingly, each of the plurality of roller members 210 is configured to selectively allow rolling movement of the carriage member 208 on the track member 202 between the first end 204 and the second end 206 thereof along the directions "D1" and/or "D2". In other embodiments, the carriage member 208 may be slidably coupled to the track member 202, such as using a sliding sleeve (not shown) between the carriage member 208 and the track member 202. In some situations, one or more of the track member 202, the carriage member 208, each of the plurality of roller members 210, and/or the sliding sleeve may be coated with a low coefficient of friction material in order to limit wear between contacting surfaces. In yet other embodiments, the carriage member 208 may include any other movable members, such as a combination of rolling and sliding elements, a tooth and rack arrangement, and so on, adapted to allow movement of the carriage member 208 with respect to the track member 202 along the directions "D1" and/or "D2".

Each of the plurality of roller members 210 is disposed adjacent to one another. Also, the carriage member 208 includes a body member 212 provided in association with each of the plurality of roller members 210. More specifically, the body member 212 is secured to each of the plurality of roller members 210, in turn, securing each of the plurality of roller members 210 with respect to one another. The mechanism 144 also includes an attachment member 214. The attachment member 214 is secured to the carriage member 208.

More specifically, the attachment member 214 is secured to the body member 212. Also, the attachment member 214 is configured to be selectively secured and unsecured from the first conveyor 134 and will be explained in more detail later. In other embodiments, when the carriage member 208 may include the single roller member (not shown), the attachment member 214 may be directly coupled to the single roller member. In such a situation, the body member 212 may be optionally omitted. In the illustrated embodiment, the attachment member 214 is a U-shaped hook. In other embodiments, the attachment member 214 may be any other coupling element including, but not limited to, a C-shaped hook, an eye bolt, and a lifting hook.

Additionally, the mechanism 144 includes at least one stop member 216 provided on the track member 202. The stop member 216 is configured to limit a movement of the at least one carriage member 208 over the track member 202. For example, in the illustrated embodiment, the mechanism 144 includes a first stop member 218 and a second stop member 220. The second stop member 220 is disposed spaced apart with respect to the first stop member 218. More specifically, the first stop member 218 is provided on the first end 204 of the track member 202. Accordingly, the first stop member 218 is configured to limit movement of the carriage member 208 on the track member 202 beyond the first end 204 thereof along the direction "D1".

Also, the second stop member 220 is provided on the second end 206 of the track member 202. Accordingly, the second stop member 220 is configured to limit movement of the carriage member 208 on the track member 202 beyond the second end 206 thereof along the direction "D2". As such, the first stop member 218 and the second stop member 220 limit movement of the carriage member 208 on the track member 202 between the first end 204 and the second end 206 thereof. In other embodiments, the mechanism 144 may include multiple stop members (not shown) in order to provide multiple stop points during movement of the carriage member 208 on the track member 202 between the first end 204 and the second end 206 thereof, based on application requirements.

Referring to FIGS. 3 to 7, the mechanism 144 also includes a coupling member 302. The coupling member 302 is configured to selectively secure the attachment member 214 to the first end 136 of the first conveyor 134. The attachment member 214 may be any coupling link known in the art, such as a belt, a chain, a metallic link, and so on. In some embodiments, the coupling member 302 may be any fastening element known in the art, such as a bolt and nut arrangement, a pin, and so on, configured to directly secure the first end 136 of the first conveyor 134 to the attachment member 214.

INDUSTRIAL APPLICABILITY

Figure 2:
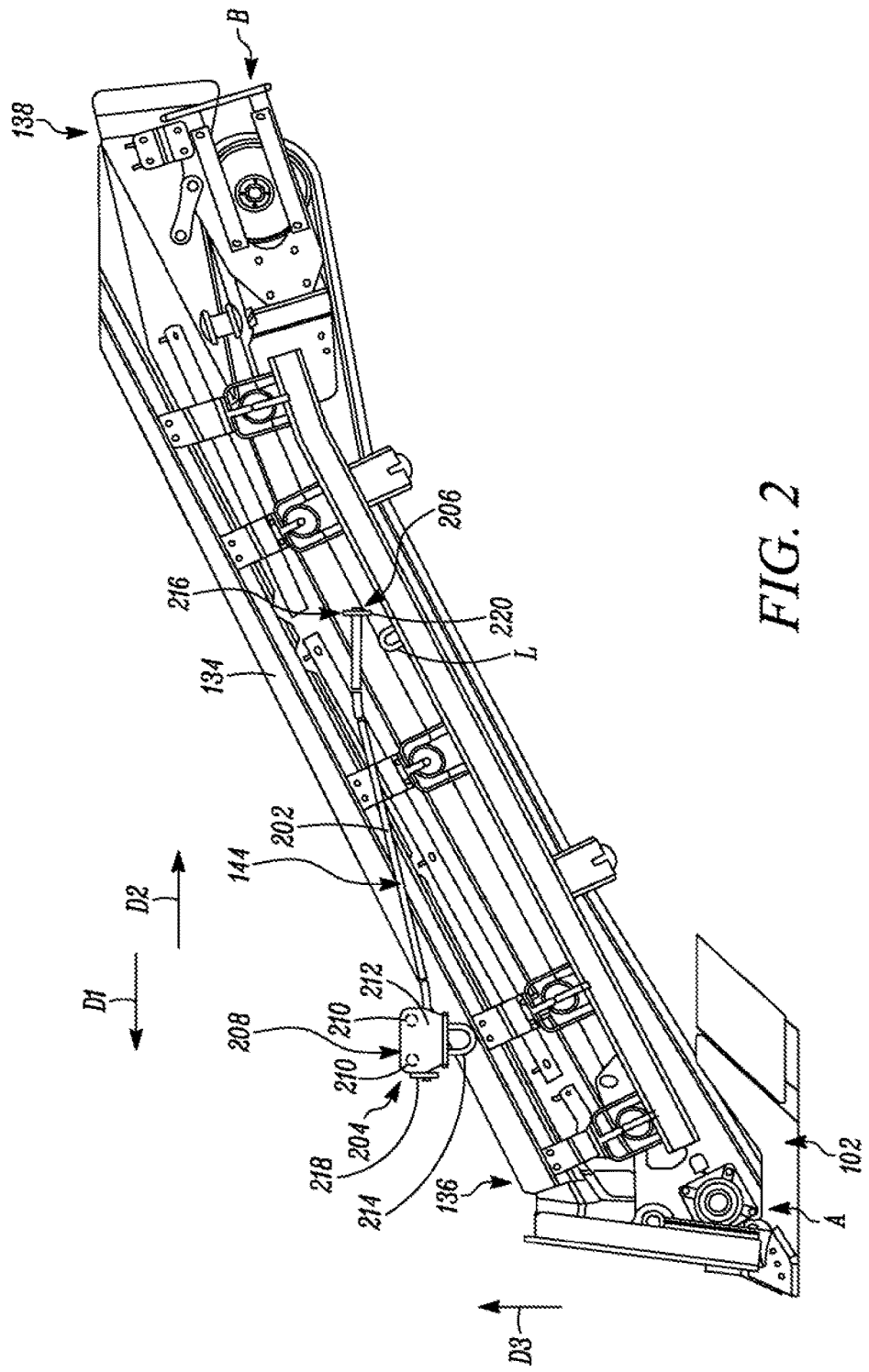
FIG. 2 is a side view of a support mechanism and a conveyor of the machine of FIG. 1, according to one embodiment of the present disclosure.
Figure 3:
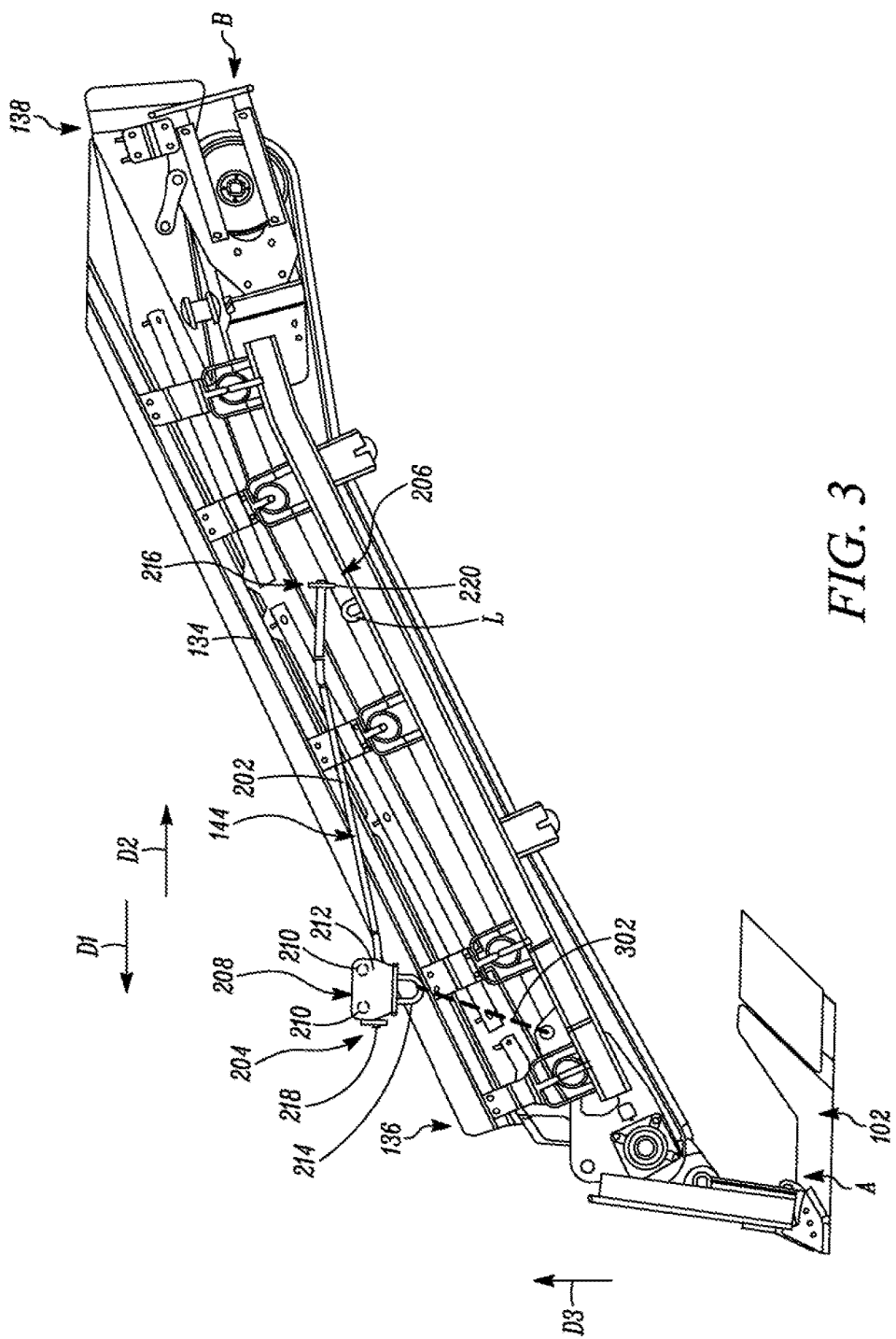
FIG. 3 is another side view of the support mechanism and the conveyor of FIG. 2, according to one embodiment of the present disclosure.

The present disclosure relates to a method 900 of removal of the first conveyor 134 from the machine 100. Referring to FIG. 9, a flowchart of the method 900 is illustrated. The method 900 will now be explained in detail with reference to FIGS. 2 to 9. At step 902, the first end 136 of the first conveyor 134 is decoupled with respect to the frame 102. More specifically, as shown in FIG. 2, the first end 136 of the first conveyor 134 is decoupled with respect to a first attachment location "A" on the frame 102 and moved in a direction "D3" with respect to the frame 102.

At step 904, the first end 136 of the first conveyor 134 is coupled with respect to the support mechanism 144. More specifically, as show in FIG. 3, the first end 136 of the first conveyor 134 is coupled with respect to the attachment member 214 provided on the carriage member 208 of the mechanism 144. In the illustrated embodiment, the first end 136 of the first conveyor 134 is coupled with respect to the attachment member 214 using the coupling member 302. In other embodiments, the first end 136 of the first conveyor 134 may be coupled with respect to the attachment member 214 using the fastening element (not shown). Also, the carriage member 208 is positioned at the first end 204 of the track member 202 adjacent to the first stop member 218.

Figure 4:
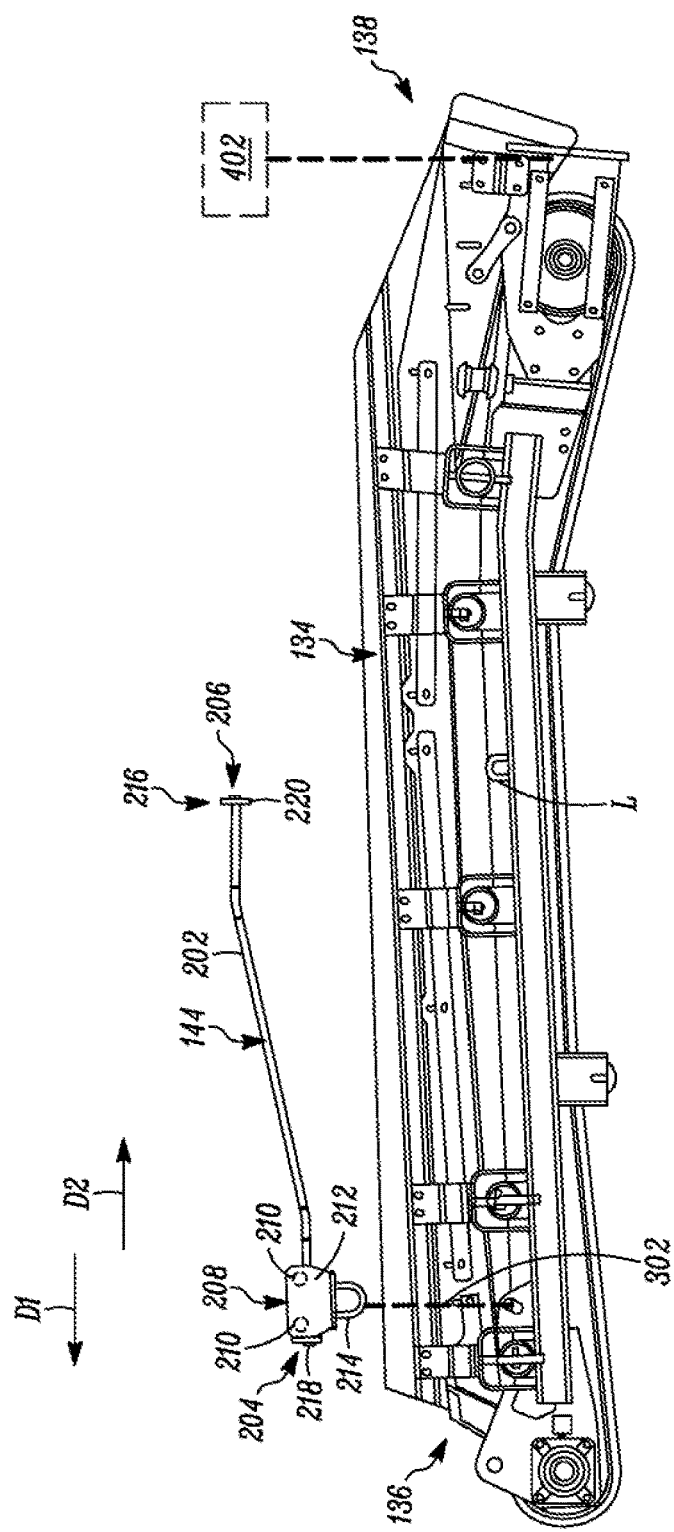
FIG. 4 is another side view of the support mechanism and the conveyor of FIG. 2, according to one embodiment of the present disclosure.

At step 906, the second end 138 of the first conveyor 134 is decoupled with respect to the frame 102. More specifically, as shown in FIG. 4, the second end 138 of the first conveyor 134 is decoupled with respect to a second attachment location "B" on the frame 102 and coupled with respect to a lifting system 402. The lifting system 402 may be any lifting mechanism known in the art, including, but not limited to, a lift crane and a hoist.

Figure 5:
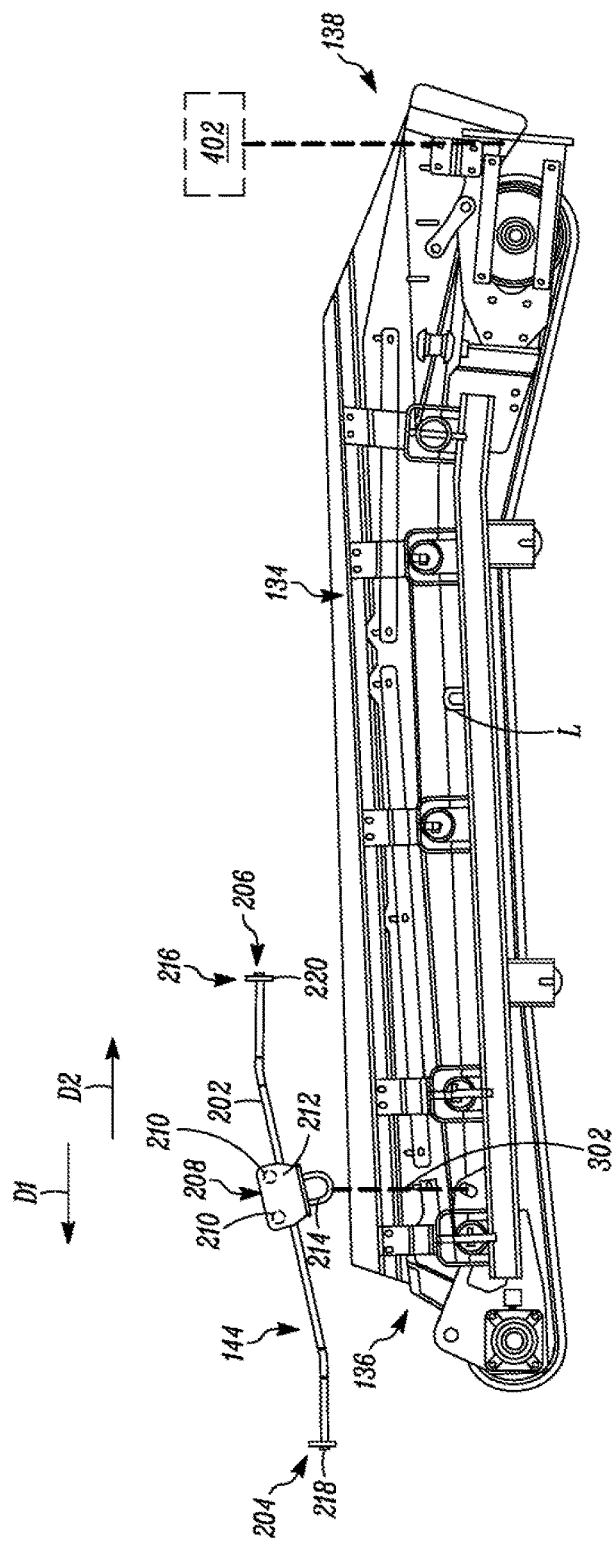
FIG. 5 is another side view of the support mechanism and the conveyor of FIG. 2, according to one embodiment of the present disclosure.
Figure 6:
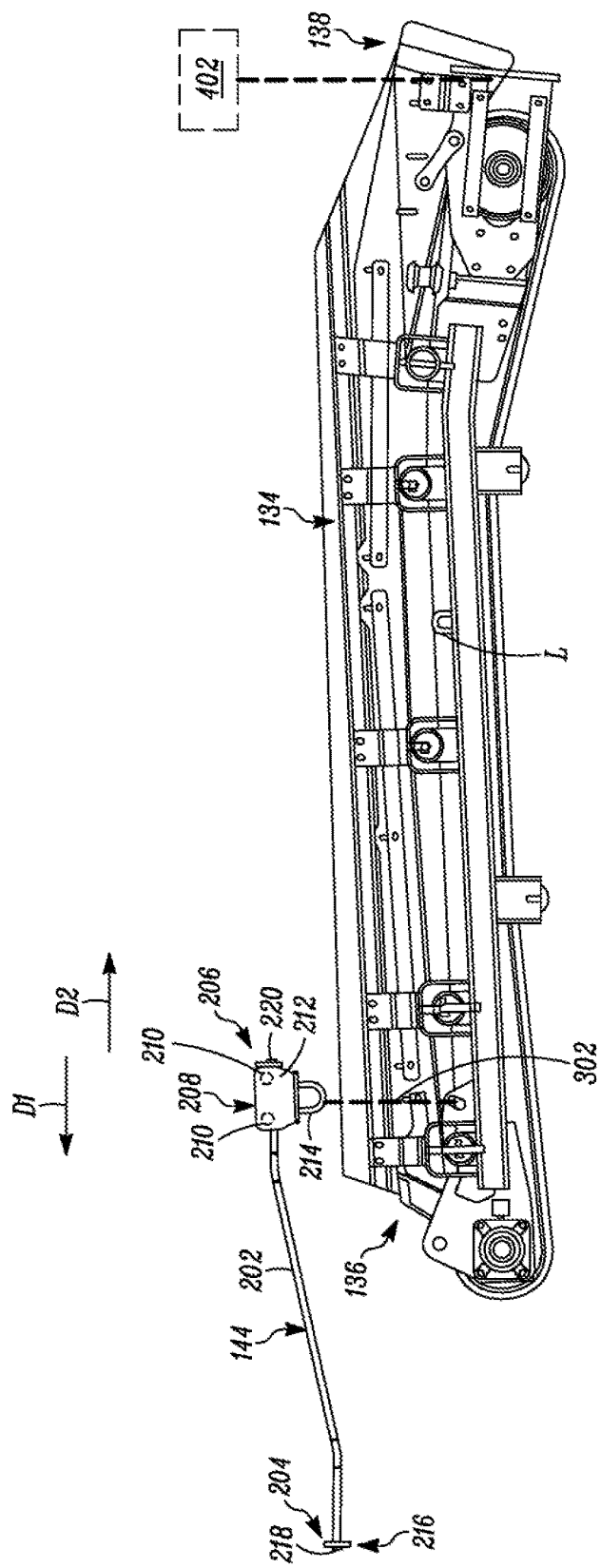
FIG. 6 is another side view of the support mechanism and the conveyor of FIG. 2, according to one embodiment of the present disclosure.

At step 908, at least a portion of the mechanism 144 is slid in order to move at least a portion of the first conveyor 134 out of the machine 100. More specifically, as shown in FIGS. 5 and 6, the carriage member 208 is moved over the track member 202 from the first end 204 toward the second end 206 thereof in the direction "D2". As such, each of the plurality of roller members 210 is moved over the track member 202 from the first end 204 toward the second end 206 thereof in the direction "D2" in order to move the first end 136 of the first conveyor 134. Accordingly, the second end 138 of the first conveyor 134 is moved out of the machine 100.

Figure 8:
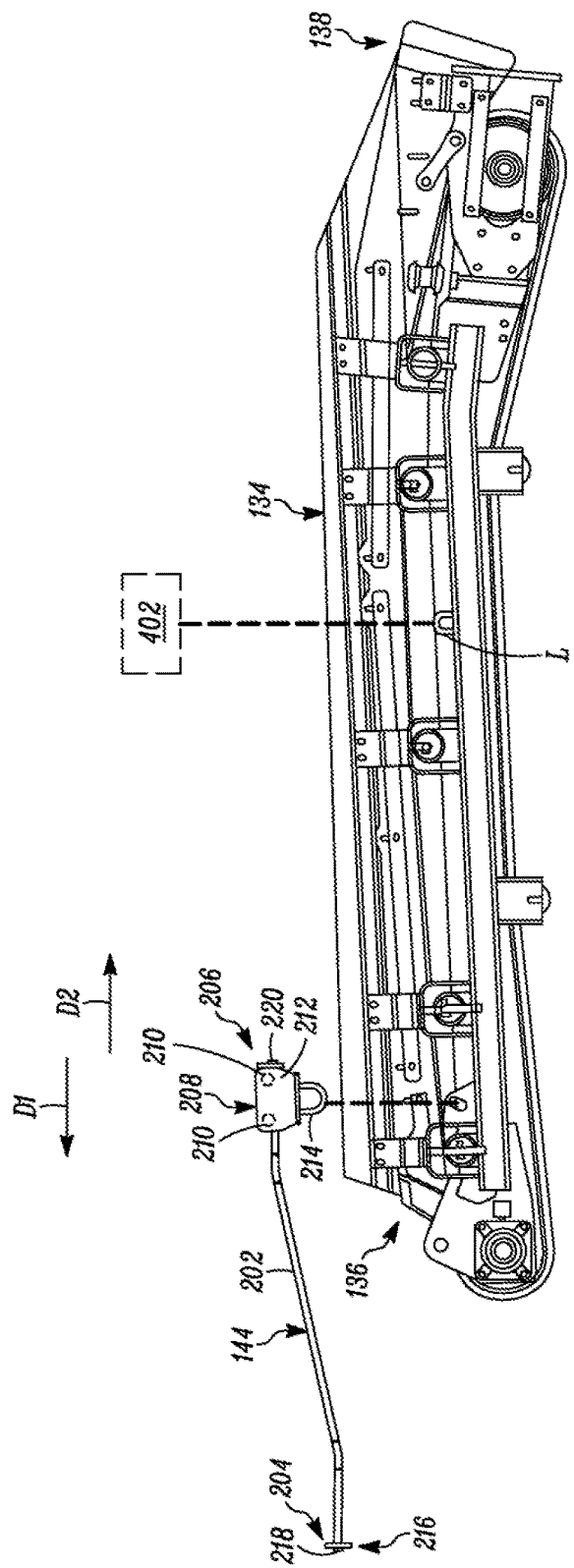
FIG. 8 is yet another side view of the support mechanism and the conveyor of FIG. 2, according to one embodiment of the present disclosure.
Figure 9:
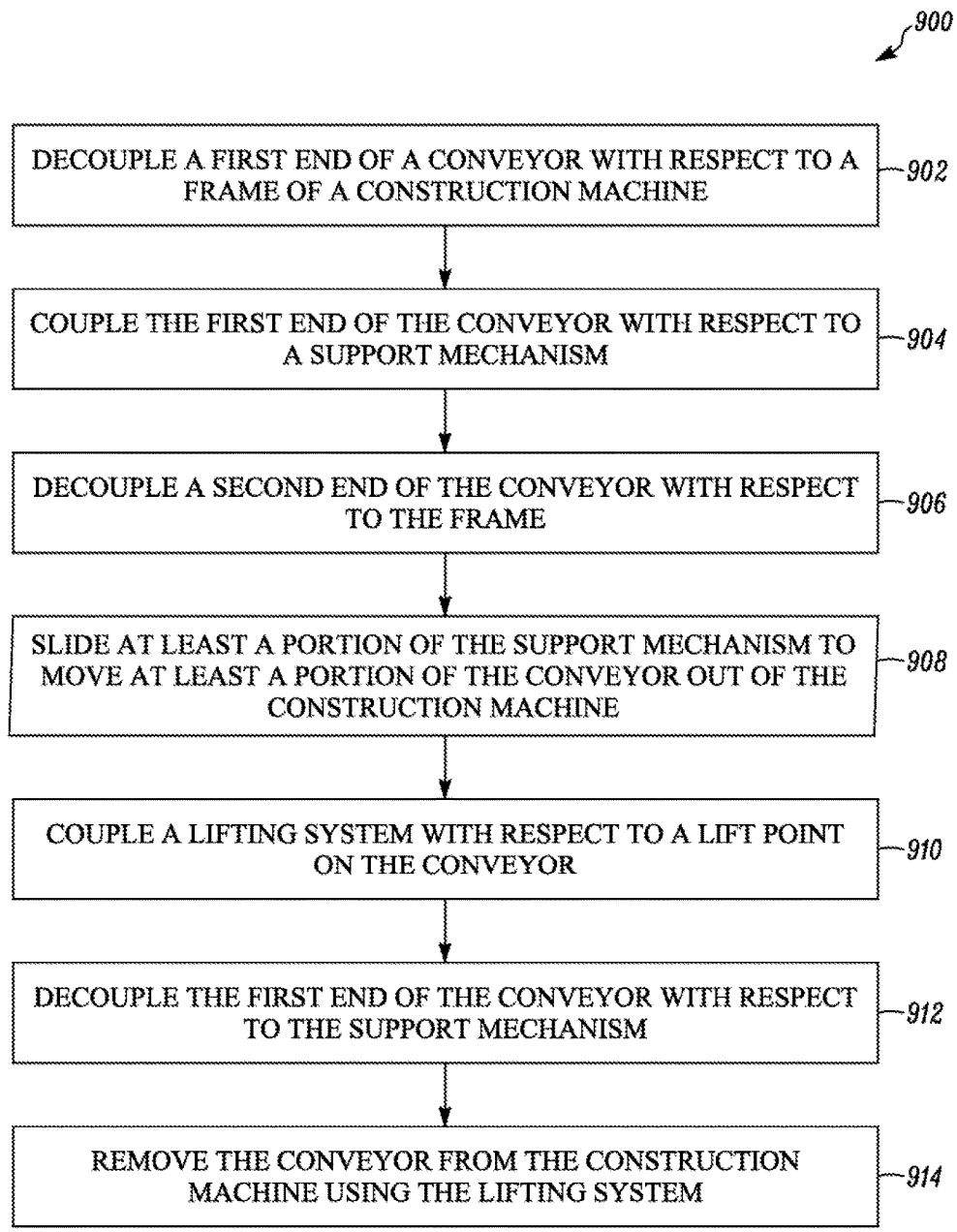
FIG. 9 is a flowchart illustrating a method of removal of the conveyor of the machine of FIG. 1, according to one embodiment of the present disclosure.

At step 910, as shown in FIG. 8, the lifting system 402 is coupled with respect to a lift point "L" on the first conveyor 134. In the illustrated embodiment, the lift point "L" refers to a center of gravity related to the first conveyor 134. The lift point "L" provides to hold and lift the first conveyor 134 using the lifting system 402 through a single attachment point. In other embodiments, the lift point "L" may refer to any other attachment point on the first conveyor 134 configured to hold and lift the first conveyor 134 thereby.

Figure 7:
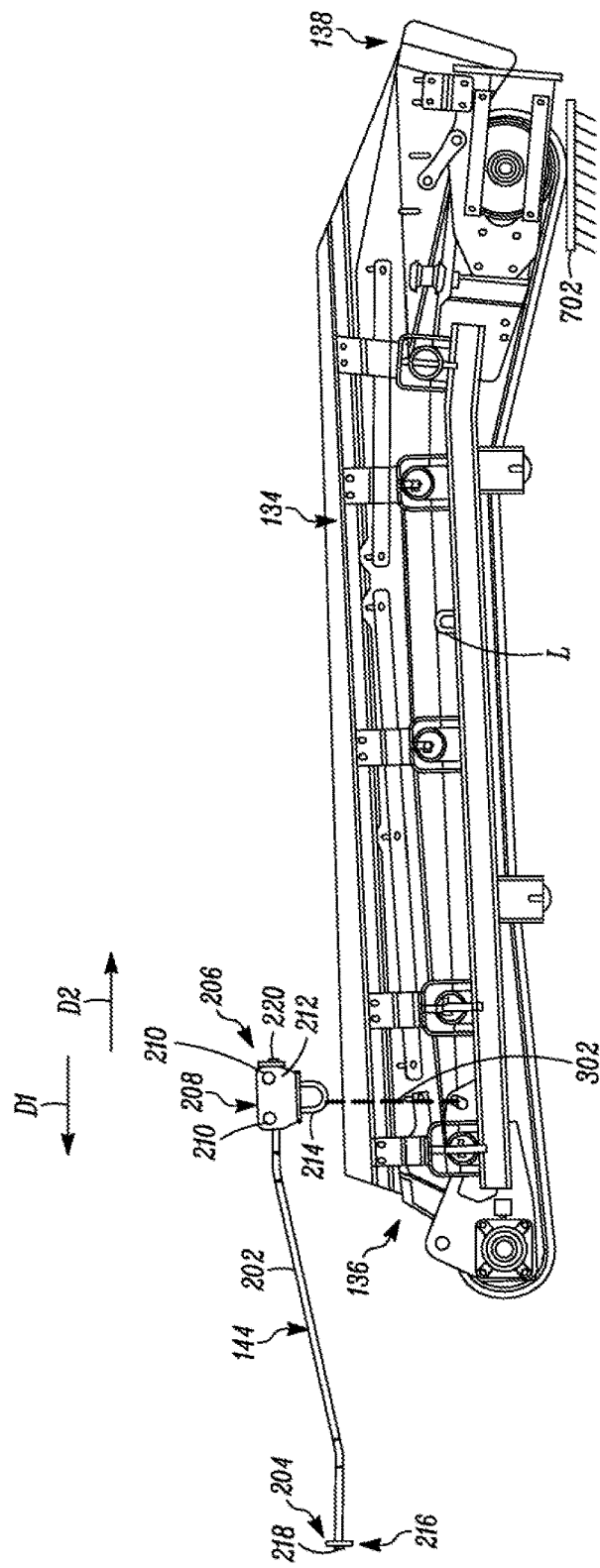
FIG. 7 is another side view of the support mechanism and the conveyor of FIG. 2, according to one embodiment of the present disclosure.

More specifically, as shown in FIG. 7, prior to coupling the lifting system 402 with respect to the lift point "L" on the first conveyor 134, the second end 138 of the first conveyor 134 is supported on a support structure 702. The support structure 702 may be any structure configured to temporarily support the second end 138 of the first conveyor 134, such as a wall, a stage, a pillar, a scaffold, a hoist, a lift crane, and so on. Accordingly, the lifting system 402 is decoupled with respect to the second end 138 of the first conveyor 134 and coupled with respect to the lift point "L".

At step 912, the first end 136 of the first conveyor 134 is decoupled with respect to the mechanism 144. More specifically, as shown in FIG. 8, the coupling member 302 is decoupled with respect to the attachment member 214 and the first end 136 of the first conveyor 134. At step 914, the first conveyor 134 is removed from the machine 100 using the lifting system 402. Accordingly, the first conveyor 134 may be removed from the machine 100 using the lifting system 402 coupled to the single lift point "L" on the first conveyor 134.

It should be noted that the mechanism 144 may be also be employed during installation of the first conveyor 134 on the machine 100. In such a situation, the method 900 may be employed in a substantially reverse manner. For example, during installation process, the first conveyor 134 may be coupled with respect to the lifting system 402 through the lift point "L". The first conveyor 134 may be then positioned with respect to the machine 100, such that the first end 136 of the first conveyor 134 may be adjacent to the frame 102 of the machine 100.

The carriage member 208 of the mechanism 144 may be positioned at the second end 206 of the track member 202 adjacent to the second stop member 220. Further, the first end 136 of the first conveyor 134 may be coupled with respect to the attachment member 214 of the mechanism 144 using the coupling member 302. The second end 138 of the first conveyor 134 may be then supported on the support structure 702. The lifting system 402 may be then decoupled with respect to the lift point "L" and may be coupled with respect to the second end 138 of the first conveyor 134.

The carriage member 208 may be then moved toward the first end 204 of the track member 202 in the direction "D1" in order to slide the first end 136 of the first conveyor 134 in to the machine 100. Also, the lifting system 402 may be moved toward the frame 102 of the machine 100 in order to assist movement of the first conveyor 134 in to the machine 100. As the carriage member 208 may reach the first end 204 of the track member 202, the coupling member 302 may be decoupled with respect to the first end 136 of the first conveyor 134.

The first end 136 of the first conveyor 134 may be then coupled with respect to the first attachment location "A" on the frame 102 of the machine 100. The second end 138 of the first conveyor 134 may be then coupled with respect to the second attachment location "B" on the frame 102 of the machine 100. The lifting system 402 may be then decoupled with respect to the second end 138 of the first conveyor 134. Accordingly, the first conveyor 134 may be installed within the machine 100 using the mechanism 144 and the lifting system 402.

The support mechanism 144 provides a simple, efficient, and cost effective method of removal and/or installation of the first conveyor 134 with respect to the frame 102 of the machine 100. As such, the first conveyor 134 may be removed and/or installed within the machine 100 using only the mechanism 144 and the lifting system 402, in turn, limiting need of multiple equipment, tools, complex process, and so on. This may result in reduced removal/installation duration, reduced labor effort, reduced machine downtime, reduced service duration, increased productivity, and so on. Also, the mechanism 144 includes a simple design using regularly employed components, thus, reducing an overall cost of the mechanism 144. As such, the mechanism 144 may be installed in any machine with little or no modification to the existing system.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of the disclosure. Such embodiments should be understood to fall within the scope of the present disclosure as determined based upon the claims and any equivalents thereof.

What is claimed is:

1. A construction machine comprising:
   a frame;
   an engine mounted on the frame;
   a milling tool rotatably mounted on the frame and configured to be selectively coupled to the engine;
   a conveyor removably mounted on the frame; and
   a support mechanism mounted on the frame, the support mechanism comprising:
   a track member secured to the frame;
   at least one carriage member movably mounted on the track member; and
   an attachment member secured to the at least one carriage member and the conveyor, the attachment member configured to be selectively unsecured from the conveyor,
   wherein the support mechanism is configured to move at least a portion of the conveyor relative to the construction machine; and
   wherein the conveyor includes a lift point proximate a center of gravity of the conveyor and configured to be coupled to a lifting system such that the conveyor can be removed from the construction machine using the lifting system.

2. The construction machine of claim 1, wherein the at least one carriage member includes at least one roller member.

3. The construction machine of claim 2, wherein the at least one roller member includes a plurality of roller members, each of the plurality of roller members is secured to one another using a body member.

4. The construction machine of claim 3, wherein the attachment member is secured to the body member.

5. The construction machine of claim 1 further includes a coupling member configured to secure the attachment member to the conveyor.

6. The construction machine of claim 1 further includes at least one stop member provided on the track member, the at least one stop member configured to limit a movement of the at least one carriage member over the track member.

7. The construction machine of claim 1, wherein the at least one carriage member is configured to be slidably coupled to the track member.

8. A support mechanism for a conveyor associated with a construction machine, the support mechanism comprising:
   a track member configured to be secured to the construction machine;
   at least one carriage member configured to be movably mounted on the track member; and
   an attachment member configured to be secured to the at least one carriage member and the conveyor, the attachment member configured to be selectively unsecured from the conveyor,
   wherein the support mechanism is configured to move at least a portion of the conveyor relative to the construction machine; and
   wherein the conveyor includes a lift point proximate a center of gravity of the conveyor and configured to be coupled to a lifting system such that the conveyor can be removed from the construction machine using the lifting system.

9. The support mechanism of claim 8, wherein the at least one carriage member includes at least one roller member.

10. The support mechanism of claim 9, wherein the at least one roller member includes a plurality of roller members, each of the plurality of roller members is secured to one another using a body member.

11. The support mechanism of claim 10, wherein the attachment member is secured to the body member.

12. The support mechanism of claim 8 further includes a coupling member configured to secure the attachment member to the conveyor.

13. The support mechanism of claim 8 further includes at least one stop member provided on the track member, the at least one stop member configured to limit a movement of the at least one carriage member over the track member.

14. The support mechanism of claim 8, wherein the at least one carriage member is configured to be slidably coupled to the track member.

15. A method for removal of a conveyor of a construction machine, the conveyor removably mounted on a frame of the construction machine, the method comprising:
    decoupling a first end of the conveyor with respect to the frame;
    coupling the first end of the conveyor with respect to a support mechanism;
    decoupling a second end of the conveyor with respect to the frame;
    sliding at least a portion of the support mechanism to move at least a portion of the conveyor out of the construction machine;
    coupling a lifting system with respect to a lift point on the conveyor;
    decoupling the first end of the conveyor with respect to the support mechanism; and
    removing the conveyor from the construction machine using the lifting system.

16. The method of claim 15, wherein coupling the first end of the conveyor further includes coupling the first end of the conveyor with respect to an attachment member of the support mechanism.

17. The method of claim 15, wherein decoupling the second end of the conveyor further includes coupling the second end of the conveyor with respect to the lifting system.

18. The method of claim 17, wherein coupling the lifting system with respect to the lift point further includes decoupling the second end of the conveyor with respect to the lifting system.

19. The method of claim 18, wherein coupling the lifting system with respect to the lift point further includes supporting the second end of the conveyor using a support structure.

20. The method of claim 15, wherein sliding at least the portion of the support mechanism further includes moving a carriage member over a track member of the support mechanism.

* * * * *